(12) United States Patent  
Nakagawa (10) Patent No.: US 6,452,690 B1
(45) Date of Patent: Sep. 17, 2002

(54) IMAGE FORMING METHOD AND IMAGE FORMING APPARATUS USING THE METHOD

(75) Inventor: Jun Nakagawa, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/175,136

(22) Filed: Oct. 19, 1998

(30) Foreign Application Priority Data

Oct. 22, 1997 (JP) .............................................. 9-289717

(51) Int. Cl.[7] .............................................. G06K 15/00
(52) U.S. Cl. ........................................ 358/1.15; 358/1.1
(58) Field of Search ......................... 358/414, 296–298, 358/483, 477, 496, 494, 497, 1.1, 1.17, 1.15–1.16, 411, 413, 419, 412, 406, 401, 474, 447, 443, 408; 345/530.533, 533, 534, 545, 558, 574

(56) References Cited

U.S. PATENT DOCUMENTS 4,367,493 A    1/1983   Matteson 5,091,978 A    2/1992   Hirota
5,402,252 A    3/1995   Kojima

FOREIGN PATENT DOCUMENTS

EP          0 411 954 A2    2/1991

*Primary Examiner*—Arthur G. Evans
(74) *Attorney, Agent, or Firm*—Frishauf, Holtz, Goodman & Chick, P.C.

(57) ABSTRACT

An image forming apparatus includes: an image reading device for reading an image to generate image data; a memory capable of writing and reading data in parallel, for storing the generated image data; an image forming device driven by a scan-writing clock having a frequency different from that of a reading clock of the image reading device for reading the image data stored in the memory, thereby to form the image; and a timing control device for shifting a timing for writing the image data in the memory from the image reading device and a timing for the image forming device to read the image data from the memory, and for controlling the image forming device to continuously read the image data in a predetermined quantity from the memory. The image reading device writes the image data in the memory at a unit of data in the predetermined quantity.

6 Claims, 9 Drawing Sheets

IMAGE FORMING METHOD AND IMAGE FORMING APPARATUS USING THE METHOD

BACKGROUND OF THE INVENTION

The present invention relates to an image forming method and an image forming apparatus, and more specifically, to the control of timing between an image reading means (a scanner) and an image forming apparatus (a printer).

In an image forming apparatus such as a copying machine equipped with an image reading means (a scanner) and an image forming apparatus (a printer), a reading clock of the scanner is sometimes different from a scan-writing clock of the printer in terms of frequency. Namely, the foregoing is an occasion where the scan-reading speed per line of the scanner is different from the image forming speed per line of the printer.

A measure to be taken for the aforesaid occasion used to be one wherein two FIFO (first-in first-out) memories were used to read and write alternately so that the clock frequency difference between the scanner and the printer may be absorbed.

Figure 7:
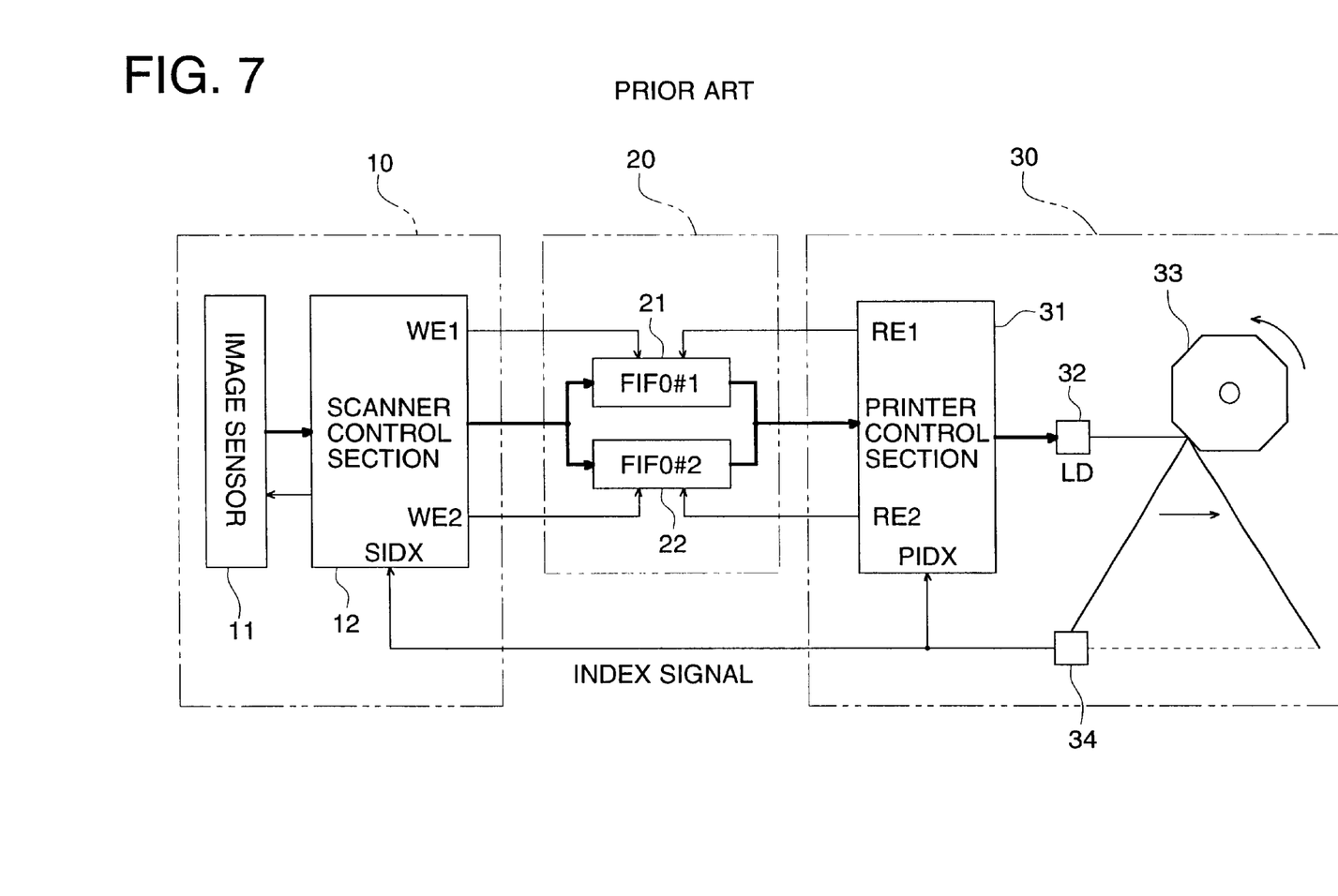
FIG. 7 is a function block diagram showing the structure of the conventional image forming apparatus employing two memories.

Namely, as shown in FIG. 7, in an image forming apparatus equipped with scanner 10, storage section 20 and printer 30, there are provided FIFO memory 21 and FIFO memory 22 in the storage section 20.

In this structure, operations are conducted in timing shown in FIG. 8(a)–FIG. 8(j). In this case, index signals obtained by detecting scanning light of polygon mirror 33 with index sensor 34 are utilized as SIDX (FIG. 8(a)) in scanner control section 12, and are utilized as PIDX (FIG. 8(e)) in printer control section 31.

Figure 8:
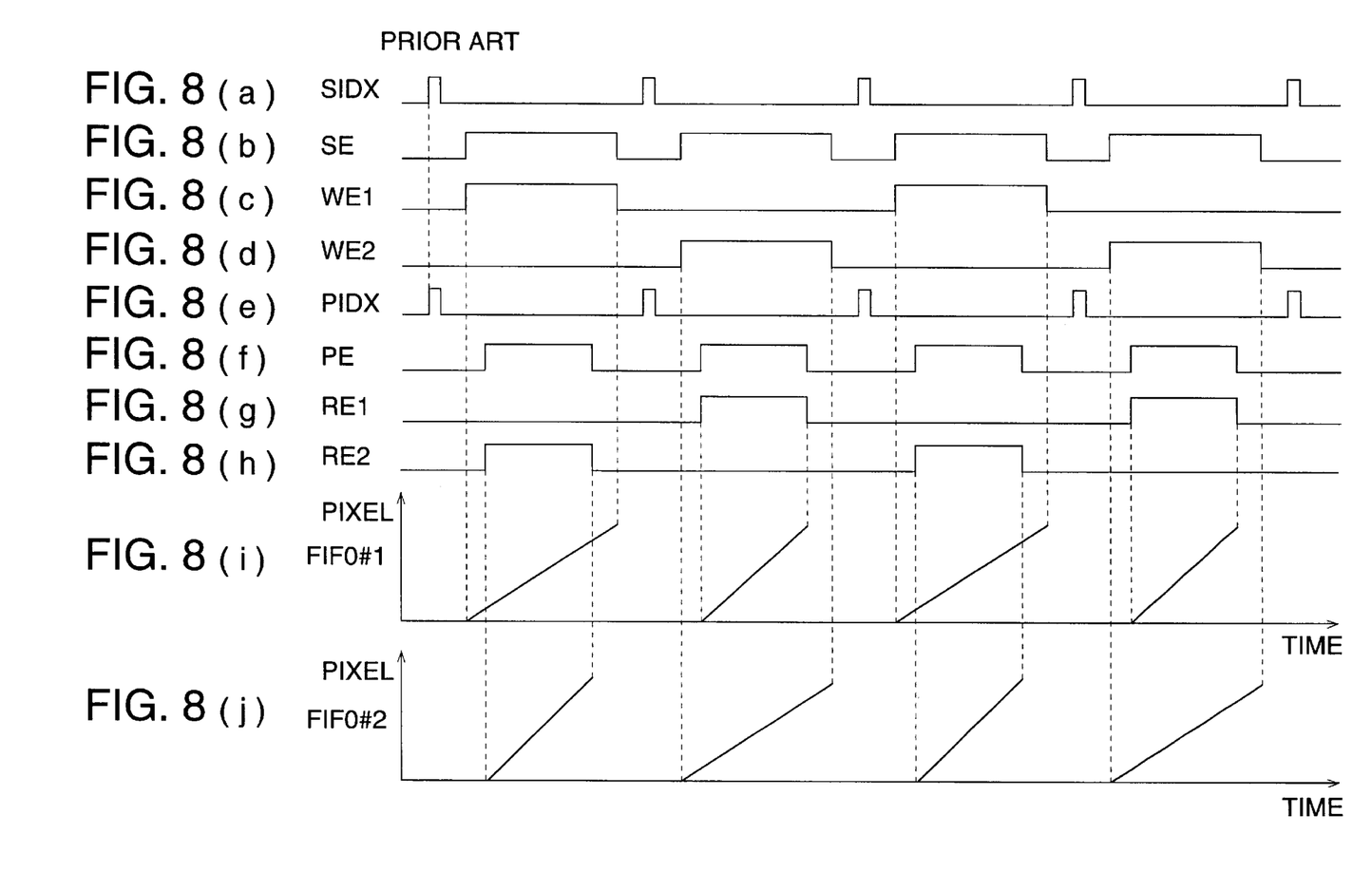

The scanner control section 12 generates write enable signal WE1 (FIG. 8(c)) corresponding to writing in FIFO memory 21, and generates write enable signal WE2 (FIG. 8(d)) corresponding to writing in FIFO memory 22.

The printer control section 31 generates read enable signal RE1 (FIG. 8(g)) corresponding to reading out from FIFO memory 21, and generates read enable signal RE2 (FIG. 8(h)) corresponding to reading out from FIFO memory 22.

In this case, when data from scanner 10 is being written in FIFO memory 21, reading out is being conducted from FIFO memory 22 to printer 30, and when data from scanner 10 is being written in FIFO memory 22, reading out is being conducted from FIFO memory 21 to printer 30.

Thus, image forming is conducted while absorbing the clock frequency difference between the scanner 10 and the printer 30 by conducting writing in and reading out alternately, using both FIFO memories.

In the aforesaid technique of FIG. 7 and FIGS. 8(a)–8(j), two FIFO memories are required, which results in a relatively expensive apparatus.

It has therefore been considered that a dual port type FIFO memory which can simultaneously conduct writing in and reading out be used. Each of FIGS. 9(a)–9(g) is a time chart showing the timing in the case where one FIFO memory is used.

Points where the scanner 10 and the printer 30 operate by the use of index signals from index sensor 34 (FIGS. 9(a), 9(b), 9(c) and FIGS. 9(d), 9(e), 9(f)) are the same as those in FIGS. 8(a)–8(j).

Figures 9A, 9G:
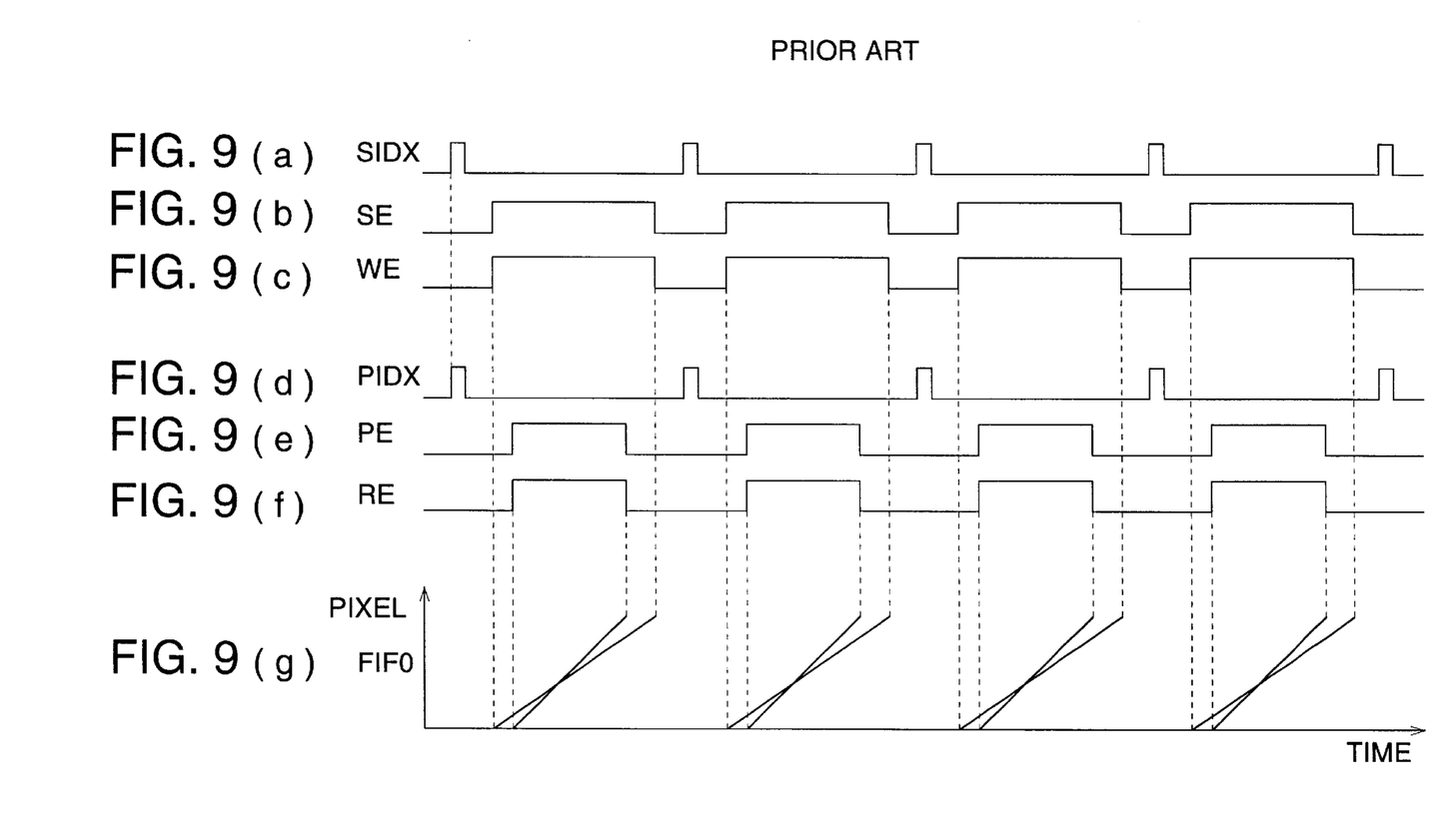

In this case, a phenomenon results wherein reading out passes writing in as shown in FIG. 9(g), because write enable WE (FIG. 9(c)) is superposed on read enable RE (FIG. 9(f)) in terms of timing, and the scanner 10 is different from the printer 30 in terms of clock frequency.

In the examples shown in FIGS. 9(a)–9(g), since reading by printer 30 is faster, data on the line that precedes by one line are read at the moment of the passing, thus, continuity of data on one line is lost.

When writing by scanner 10 is faster than reading by the printer, data on the line that follows by one line are read at the moment of the passing, thus, continuity of data on one line is lost.

SUMMARY OF THE INVENTION

It is therefore an object of the invention to realize an image forming method and an image forming apparatus which can absorb a difference in clock frequency by using one piece of memory when a reading clock of a scanner and a scan-writing clock of a printer are different from each other in terms of frequency.

The first structure is represented by an image forming apparatus equipped with an image reading means which reads images and generates image data, a memory which can conduct writing and reading of data simultaneously and stores the image data, an image forming means which is driven by a scan-writing clock having a frequency different from that of the reading clock of the image reading means, and forms images by reading the image data stored in the aforesaid memory, and with a timing control means by which timing for writing the image data in the memory from the image reading means and timing for the image forming means to read out the image data from the memory are shifted, and with which an image forming means continuously reads out the image data in predetermined quantity from the memory, wherein the image reading means writes the image data in the memory at a unit of data in the predetermined quantity.

In the invention of the image forming method and the image forming apparatus, contents in prescribed quantity written in a memory are continuously read out at an interval of the prescribed quantity, by shifting timing for writing a memory and timing for reading out from the memory.

Accordingly, it does not happen that an address for writing in and that for reading out agree with each other, or they pass. It is therefore possible to absorb a difference of clock frequency by using one memory, when frequency of a reading clock of a scanner is different from that of a scan-writing clock of a printer.

The second structure is characterized in that the aforesaid timing control means shifts timing for writing the image data in a memory from an image reading means and timing for reading the image data from the memory to the image forming means by the use of index signals generated by an index sensor of the image forming means in the image forming apparatus in Item (1).

By shifting timing for writing in and that for reading out by the use of index signals as in the foregoing, it is possible to absorb a difference of clock frequency by using one memory, when frequency of a reading clock of a scanner is different from that of a scan-writing clock of a printer.

The third structure is characterized in that the timing control means makes timing for writing in and reading out from a memory to be variable in accordance with condition for the image reading means and the image forming means, in the image forming apparatus in Item (1).

By shifting timing for writing in and timing for reading out in accordance with the state of operations of the apparatus, it is possible to absorb a difference of clock frequency by using one memory, and to cope with even in the case of mode change in the apparatus.

BRIEF DESCRIPTION OF THE DRAWINGS

Each of FIGS. 2(a)–2(g) is a time chart showing the state of operation of an image forming apparatus of the first embodiment of the invention.

Each of FIGS. 3(a) and 3(b) is a time chart showing the primary parts of the state of operation of an image forming apparatus of the first embodiment of the invention.

Each of FIGS. 8(a)–8(j) is a time chart showing the state of operation of the conventional image forming apparatus employing two memories.

Each of FIGS. 9(a)–9(g) is a time chart showing the state of operation of the conventional image forming apparatus employing one memory.

DETAILED DESCRIPTION OF THE PREFERRED EMBODIMENT

An embodiment of the invention will be explained in detail as follows.

(Structure of an Image Forming Apparatus)

Structure of an image forming apparatus used in the present embodiment will be explained first, referring to FIG. 1.

Figure 1:
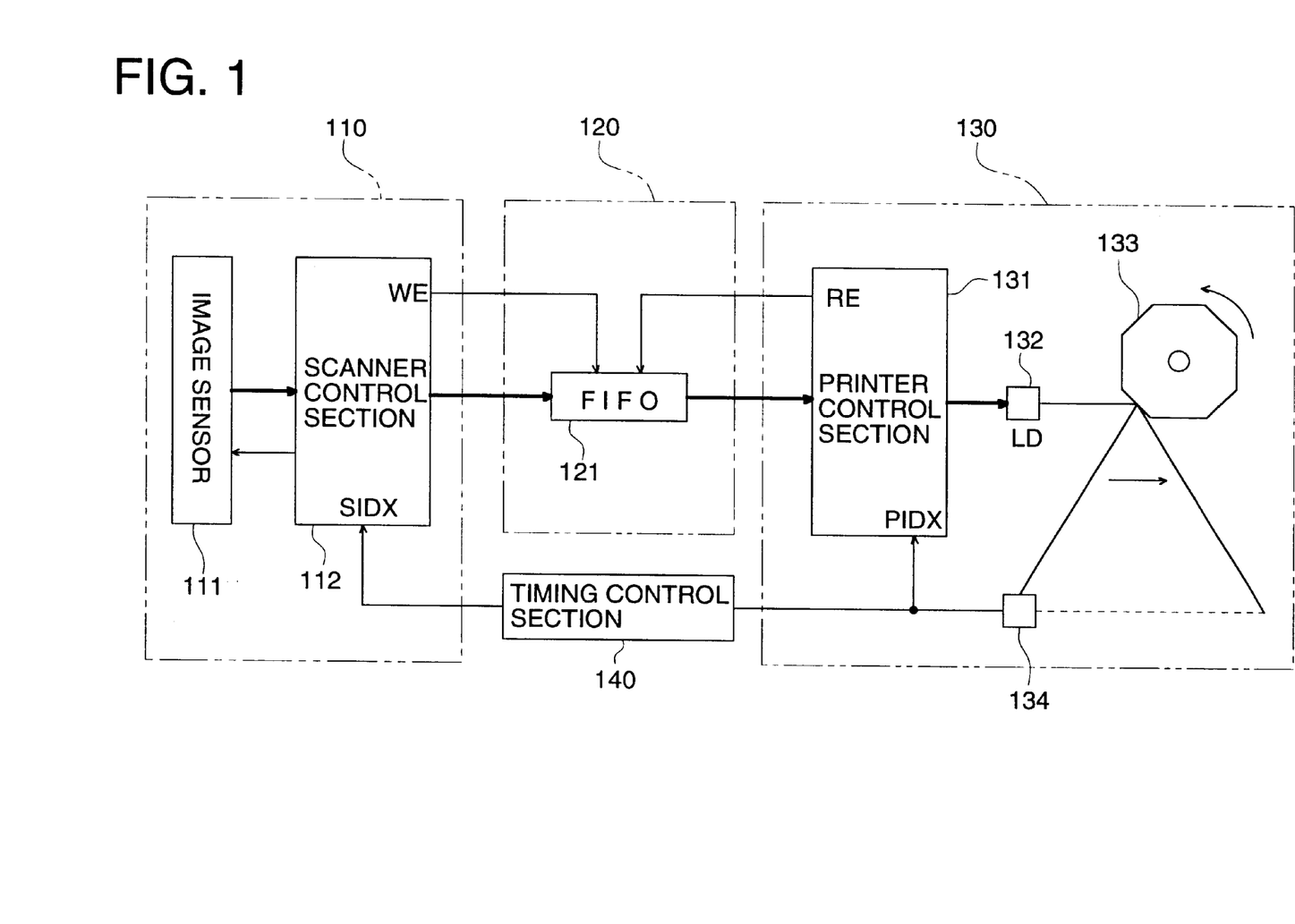
FIG. 1 is a function block diagram showing the structure of an image forming apparatus used in the first embodiment of the invention.

FIG. 1 is a functional block diagram showing an overall, electrical and schematic structure of image forming apparatus 100 of an embodiment of the invention.

In the image forming apparatus 100 shown in FIG. 1, let it be assumed that a reading clock of scanner 110 and a scan-writing clock of printer 130 are different from each other in terms of frequency, in an image forming apparatus such as a copying machine equipped with scanner 110 representing an image reading means and printer 130 representing an image forming apparatus.

In this case, the scanner 110 is equipped with image sensor 111 and scanner control section 112. Storage section 120 is equipped with FIFO memory 121 which can conduct writing and reading simultaneously. The printer 130 is equipped with printer control section 131, laser diode (LD) 132 which generates a modulated laser beam, polygon mirror 133 which causes the laser beam to scan, and index sensor 134 which generates index signals by detecting the laser beam in scanning operation at the prescribed reference position. Further, there is provided timing control section 140 which adjusts index signals generated by the printer 130 to the prescribed timing and supplies them to the scanner control section 112.

(Operations of an Image Forming Apparatus)

In the image forming apparatus having the aforesaid structure, operations are conducted at the timing shown in each of FIG. 2(a)–FIG. 2(g).

In this case, index signals obtained by detecting scanning light from the polygon mirror 133 with the index sensor 134 located at the reference position are used as printer index signals PIDX (FIG. 2(d)). Due to this, various control of the printer 130 are conducted.

The timing control section 140 generates scan index signals SIDX (FIG. 2(a)) by delaying the index signals by the prescribed time period (SDLY), and supplies them to the scanner control section 112.

Since data obtained through scanning are actually used for image formation, generating scan index signals SIDX by delaying the printer index signals PIDX by the time period (SDLY) means that the scan index signals SIDX is advanced to be ahead of the printer index signals PIDX by SADV obtained by subtracting SDLY from index signal cycle TI.

With regard to the prescribed time of SLDY, it can be determined based on the difference of clock frequency between the scanner 110 and the printer 130.

The scanner control section 112 controls various operations based on the scan index signals SIDX. For example, it generates scan effective term signals SE (FIG. 2(b)) and write enable signals WE (FIG. 2(c)) for writing FIFO memory 121, in synchronization with the scan index signals SIDX.

Figure 2:
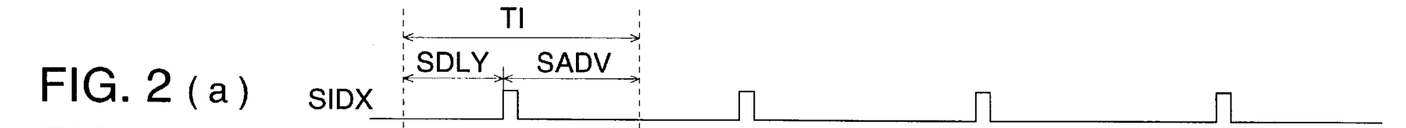

The printer control section 131 controls various operations based on the printer index signals PIDX (FIG. 2 (d)). For example, it generates image forming effective term signals PE (FIG. 2(e)) and read enable signals RE (FIG. 2 (f)) for reading FIFO memory 121, in synchronization with the printer index signals PIDX.

In this case, when the printer index signals PIDX and the scan index signals SIDX are delayed by the timing control section 140 under the prescribed conditions (in SDLY allowable range), it is eliminated that addresses for read/write agree with each other or pass each other in the FIFO memory 121. It is therefore possible to read out contents in the prescribed quantity written in the FIFO memory 121 at an interval of the prescribed quantity. Namely, it is possible to read out data for one line read by the scanner as continuous data for one line.

Therefore, when a reading clock of the scanner 110 is different from a scan-writing clock of the printer 130 in terms of frequency, it is possible to absorb a frequency difference of clocks by using one FIFO memory 121.

Figure 3A:
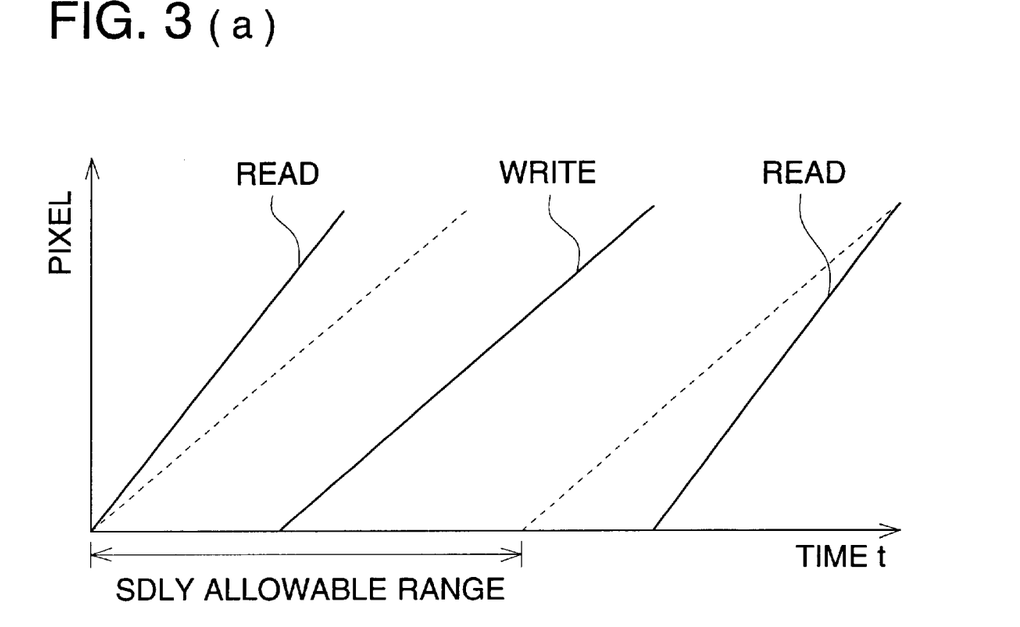

In FIG. 3(a), read timing and write timing in FIG. 2 (g) are shown under magnification. A method to avoid that addresses agree or pass each other between reading and writing when writing is slower than reading as shown in the drawing is to determine SDLY within a range of time from the timing when reading and writing agree at the address in the forefront to the timing when reading and writing agree at the address in the rear end.

Figure 3B:
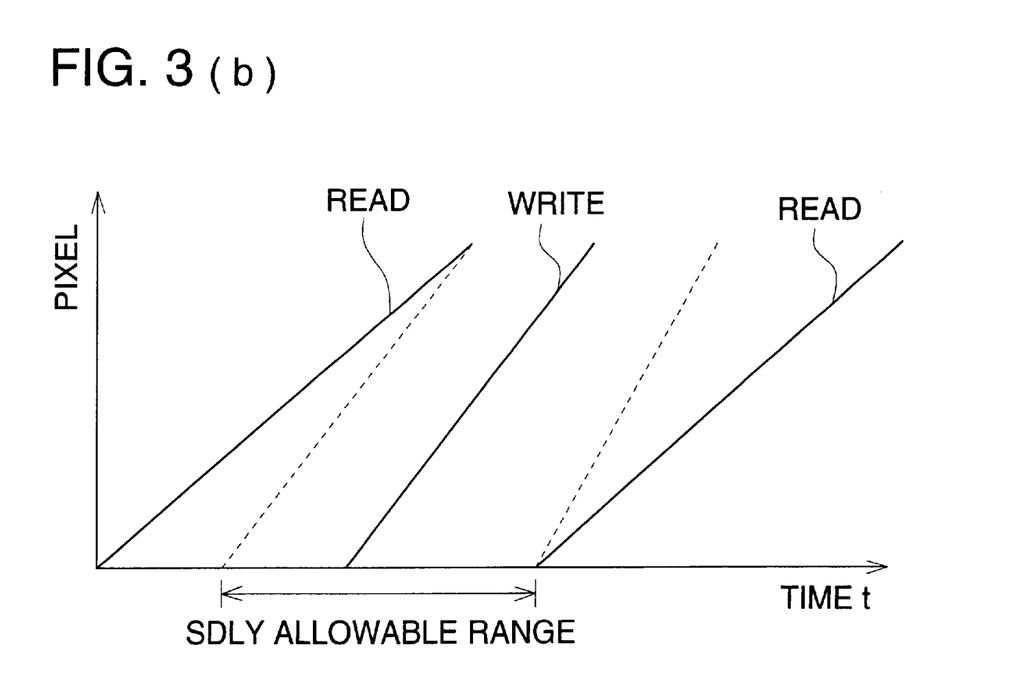

A method to avoid that addresses agree or pass each other between reading and writing when writing is faster than reading as shown in FIG. 3(b) is to determine SDLY within a range of time from the timing to the timing when reading and writing agree at the address in the forefront.

Therefore, the timing control section 140 can delay printer index signals PIDX coming from the printer 130 by obtaining the SDLY mentioned above to generate scan index signals SIDX.

When various modes such as reading density or image forming density are changed, it is possible to obtain the aforesaid SDLY with reference to the clock frequency in the mode wherein timing control section 140 has been changed.

Figure 4:
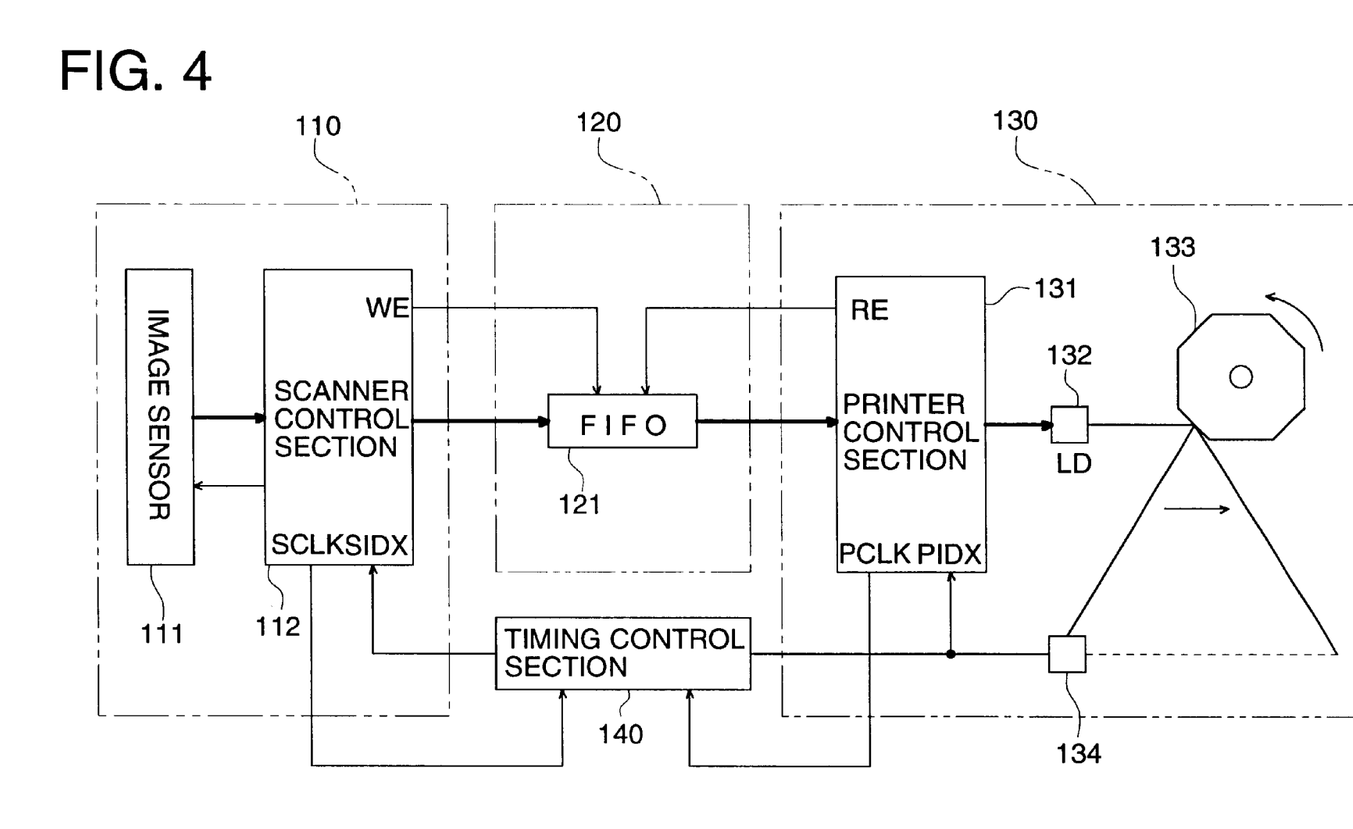
FIG. 4 is a function block diagram showing the structure of an image forming apparatus used in the second embodiment of the invention.

In this case, it is possible to arrange so that the timing control section 140 refers to clock SCLK of scanner control section 112 and to clock PCLK of printer control section 131, as shown in FIG. 4.

Figure 5:
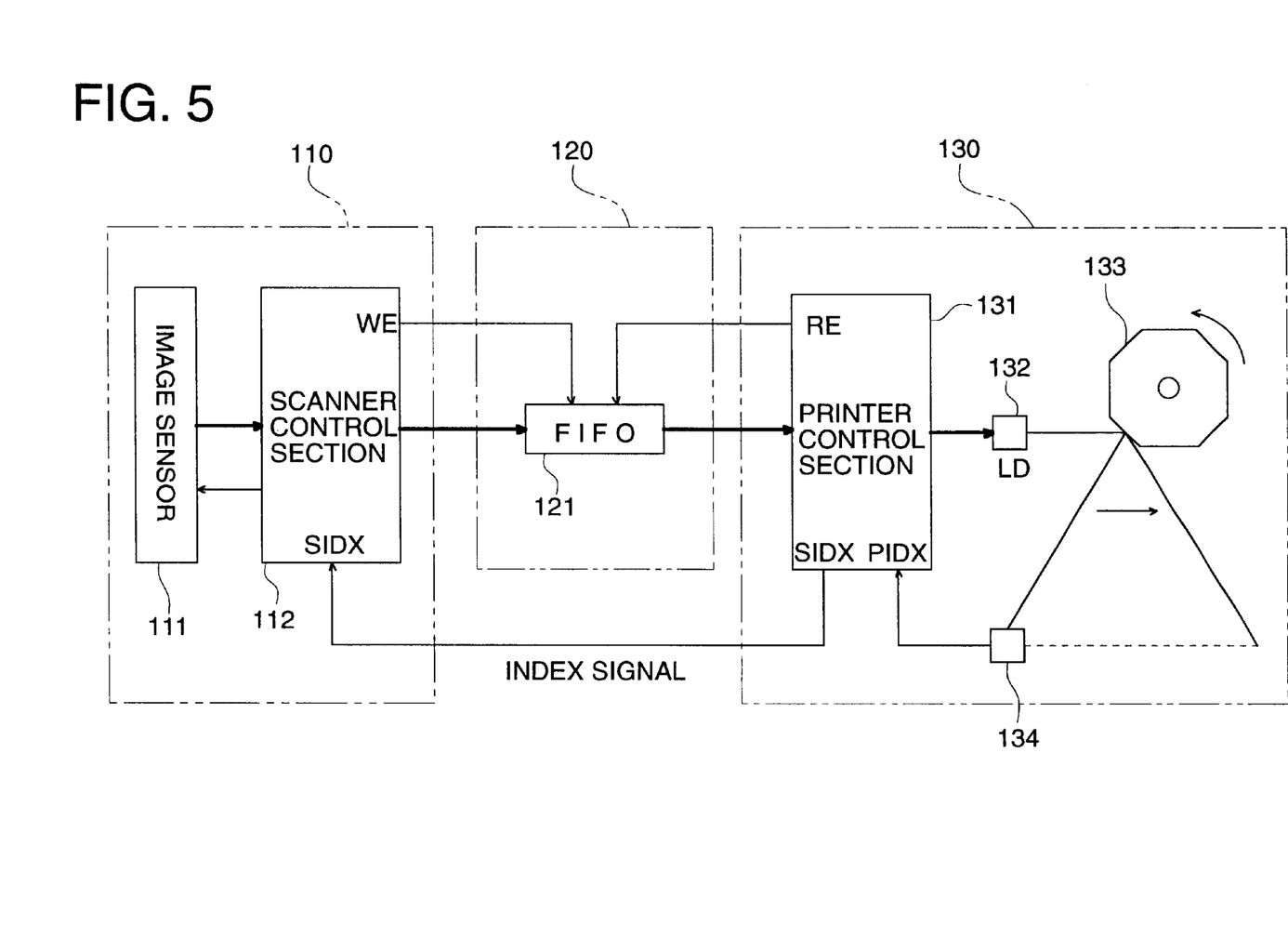
FIG. 5 is a function block diagram showing the structure of an image forming apparatus used in the third embodiment of the invention.

FIG. 5 is a block diagram showing the structure of the second embodiment of the invention. In FIG. 5, the timing control section is provided in the printer control section 131, and scan index signals SIDX are generated from printer index signals PIDX. By making an arrangement wherein the timing control section is built in the printer control section 131 as stated above, an area of circuit boards can be reduced.

Even in the case of the embodiment shown in FIG. 5, when various modes such as reading density or image forming density are changed, it is possible to obtain the aforesaid SDLY with reference to the clock frequency in the changed mode.

Figure 6:
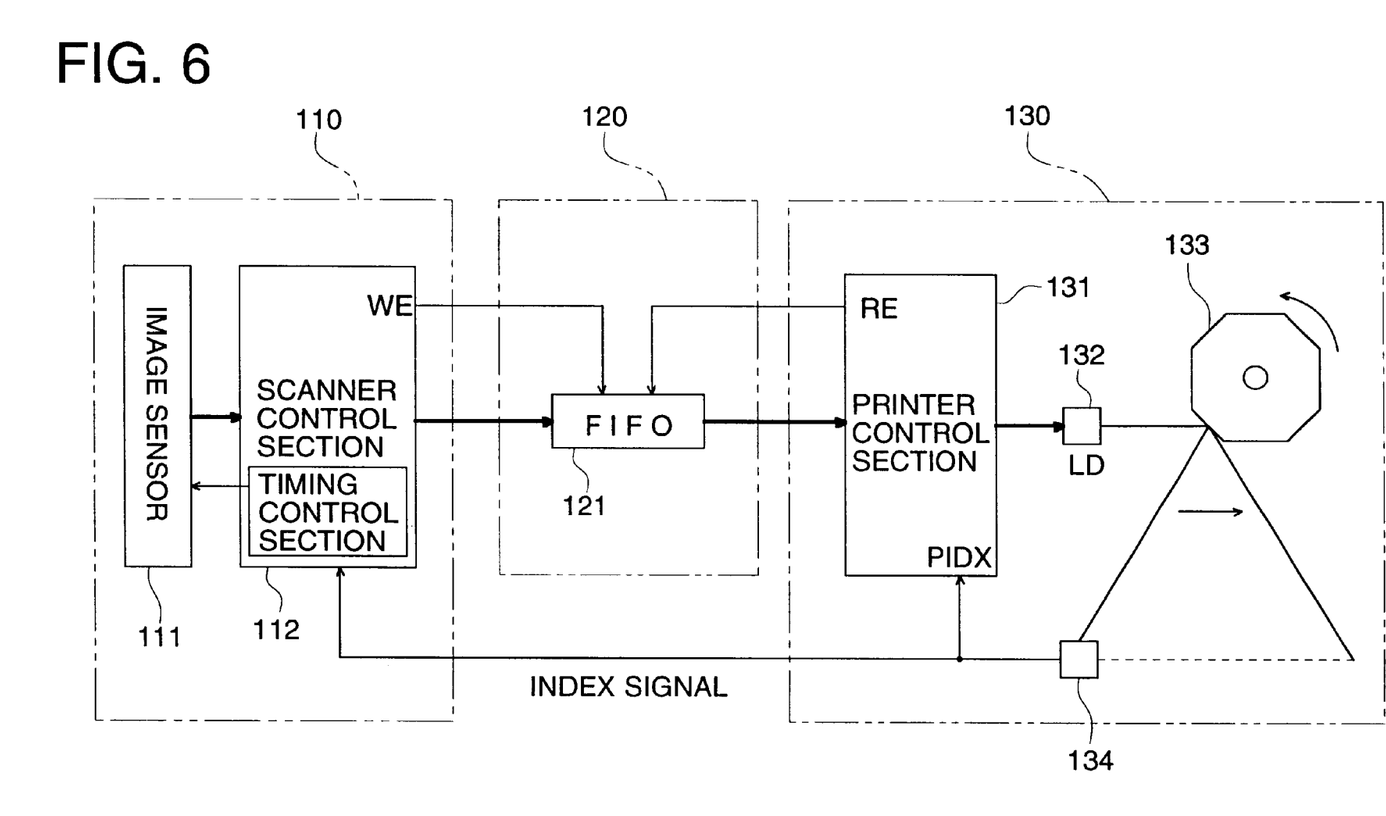
FIG. 6 is a function block diagram showing the structure of an image forming apparatus used in the fourth embodiment of the invention.

FIG. 6 is a block diagram showing the structure of the third embodiment of the invention. In FIG. 6, the timing control section is provided in the scanner control section 112, and scan index signals SIDX are generated from printer index signals PIDX. By making an arrangement wherein the timing control section is built in the printer control section 131 as stated above, an area of circuit boards can be reduced. There is further an advantageous point that the state of wiring for index signals can be the same as that of conventional circuits.

Incidentally, in the present embodiment, it is also possible to generate address reset signals of FIFO memory and data effective term signals newly in the scanner control section 112 without delaying scan index signals SIDX, in place of generating the scan index signals SIDX by delaying printer index signals PIDX.

Even in the case of the embodiment shown in FIG. 6, when various modes such as reading density or image forming density are changed, it is possible to obtain the aforesaid SDLY with reference to the clock frequency in the changed mode.

In each embodiment stated above, even in the case where scanner 110 and printer 130 are the same in terms of clock frequency, it is possible to secure normal operations by making read/write not to be overlapped as shown in FIG. 2(*f*).

As explained in detail above together with the embodiment, each invention described herein offers the following effects.

(1) In the image forming method and the image forming apparatus of the invention, when the timing to write image data in a memory and the timing to read out the image data from the memory are shifted, the image data in predetermined quantity from the memory can be read out continuously at a unit of data in the predetermined quantity. Therefore, it is eliminated that an address that is written in and an address that is read out agree with each other or pass the other. Accordingly, when a reading clock of the scanner is different from a scan-writing clock of the printer in terms of frequency, it is possible to absorb a frequency difference of clocks by using one memory.

(2) When a reading clock of the scanner is different from a scan-writing clock of the printer in terms of frequency, it is possible to absorb a frequency difference of clocks by using one memory, by shifting the timing for writing and that for reading by the use of index signals obtained by detecting scanning light.

(3) By shifting the timing for writing and that for reading in accordance with the condition for an apparatus (reading density, image forming density, etc.), it is possible to absorb a frequency difference of clocks by using one memory, and to cope with even when modes of the apparatus are changed.

What is claimed is:

1. An image forming apparatus comprising:
   (a) image reading means for reading an image to generate image data;
   (b) a single memory capable of writing and reading data in parallel and having a capacity of an image data quantity corresponding to one scanning line, for storing the generated image data;
   (c) image forming means driven by a scan-writing clock having a frequency different from that of a reading clock of the image reading means for reading the image data stored in the memory, thereby to form the image; and
   (d) timing control means for shifting a timing for writing the image data in the single memory from the image reading means and a timIng for the image forming means to read the image data from the single memory, and for controlling the image forming means to read the image data from the single memory, corresponding to one scanning line which was written in the single memory immediately before the image forming means reads, as continuous data for one scanning line.

2. The image forming apparatus of claim 1, wherein the timing control means shifts the timing for writing the image data in the single memory from the image reading means and the timing for reading the image data from the single memory to the image forming means by use of an index signal generated by an index sensor of the image forming means.

3. The image forming: apparatus of claim 2, wherein the timing control means makes the timing for writing and reading from the single memory variable in accordance with a condition for the image reading means and the image forming means.

4. An image forming apparatus comprising:
   (a) an image reader which reads an image to generate image data;
   (b) a single memory capable of writing and reading data in parallel and having a capacity of an image data quantity corresponding to one scanning line, for storing the generated image data;
   (c) an image former which is driven by a scan-writing clock having a frequency different from that of a reading clock of the image reader, the image former reading the image data stored in the single memory, to thereby form the image; and
   (d) a timing controller which shifts a timing for writing the image data in the single memory from the image reader and a timing for the image former to read the image data from the single memory, and for controlling the image former to read the image data from the single memory, corresponding to one scanning line which was written in the single memory immediately before the image former reads, as continuous data for one scanning line.

5. The image forming apparatus of claim 4, wherein the timing controller shifts the timing for writing the image data in the single memory from the image reader and the timing for reading the image data from the single memory to the image former by use of an index signal generated by an index sensor of the image former.

6. The image forming apparatus of claim 5, wherein the timing controller makes the timing for writing and reading from the memory variable in accordance with a condition for the image reader and the image former.

* * * * *